(12) United States Patent
Kobayashi

(10) Patent No.: US 8,781,242 B2
(45) Date of Patent: Jul. 15, 2014

(54) IMAGE PROCESSING APPARATUS, IMAGE PROCESSING METHOD, AND PROGRAM

(75) Inventor: Masato Kobayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 889 days.

(21) Appl. No.: 12/883,062

(22) Filed: Sep. 15, 2010

(65) Prior Publication Data

US 2011/0069203 A1    Mar. 24, 2011

(30) Foreign Application Priority Data

Sep. 18, 2009   (JP) .................................. 2009-216534

(51) Int. Cl.
  *G06K 9/40* (2006.01)
(52) U.S. Cl.
  USPC ............ 382/254; 348/234; 348/631; 382/167
(58) Field of Classification Search
  USPC .......... 348/234, 674, 248; 382/162, 254, 268, 382/270, 272, 167, 274
  See application file for complete search history.

(56) References Cited

U.S. PATENT DOCUMENTS

| | | | |
|---|---|---|---|
| 6,753,910 B1 * | 6/2004 | Ogata et al. | 348/235 |
| 7,082,218 B2 * | 7/2006 | Pollard et al. | 382/167 |
| 7,369,183 B2 * | 5/2008 | Oka et al. | 348/674 |
| 7,471,847 B2 * | 12/2008 | Yano | 382/274 |
| 7,526,141 B2 * | 4/2009 | Ogata et al. | 382/274 |
| 7,768,681 B2 * | 8/2010 | Kuwata | 358/518 |
| 7,881,543 B2 * | 2/2011 | Okada et al. | 382/232 |
| 7,889,279 B2 * | 2/2011 | Chen | 348/631 |
| 7,899,266 B2 * | 3/2011 | Mitsunaga | 382/274 |
| 8,203,632 B2 * | 6/2012 | Mitsui et al. | 348/248 |
| 8,228,560 B2 * | 7/2012 | Hooper | 358/3.27 |
| 8,373,644 B2 * | 2/2013 | Koike et al. | 345/102 |
| 2004/0114821 A1 * | 6/2004 | Fukuzawa | 382/240 |
| 2008/0002905 A1 | 1/2008 | Kuno | |
| 2009/0002562 A1 * | 1/2009 | Yokoyama et al. | 348/673 |
| 2011/0069203 A1 * | 3/2011 | Kobayashi | 348/234 |

FOREIGN PATENT DOCUMENTS

JP    2008-011286 A    1/2008

* cited by examiner

*Primary Examiner* — Gregory M Desire
(74) *Attorney, Agent, or Firm* — Carter, DeLuca, Farrell & Schmidt, LLP

(57) ABSTRACT

A method for processing an image includes acquiring a low frequency component of a luminance component of an image, correcting the luminance component of the image using the acquired low frequency component, determining a level correction amount of each pixel of the corrected image using a frequency distribution of low frequency components of the acquired image and a low frequency component of each pixel of the image, and performing level correction using the determined level correction amount and a luminance distribution of the corrected image.

8 Claims, 16 Drawing Sheets

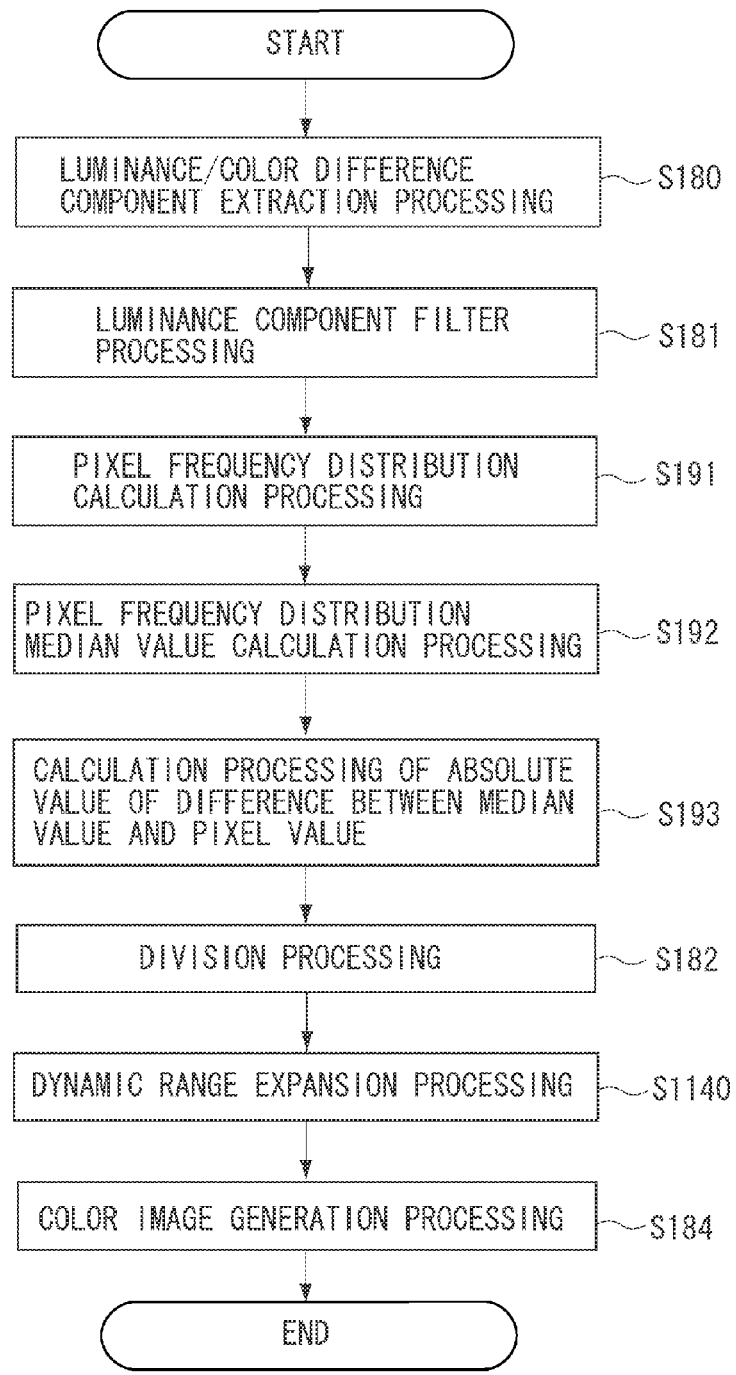

PRIOR ART

IMAGE PROCESSING APPARATUS, IMAGE PROCESSING METHOD, AND PROGRAM

BACKGROUND OF THE INVENTION

1. Field of the Invention

The present invention relates to an image processing technique for adjusting brightness of an image, and more particularly to a technique for adjusting luminance of an image using an estimated illumination light distribution of an image.

2. Description of the Related Art

According to the spread of digitized photographic images, users of personal computers and printers can correct images using such apparatuses. Nowadays, personal computer users adjust tint and contrast of a photographed image (photographic image) using applications. Further, many techniques have been developed which are useful in automatically correcting overall image brightness when an image is output by a printer.

Generally, conventional photograph correction is used for mainly correcting the overall image according to its feature. Thus, it has been difficult to correct the brightness of a local dark portion like a backlight image. As a method for correcting brightness of a local portion, there is a method that estimates an illumination light distribution of an image and corrects the luminance according to the distribution.

According to the local brightness correction (hereinafter referred to as local luminance correction) method based on the estimated illumination light distribution, the distribution of the illumination light is assumed to change gradually. Thus, the luminance distribution is estimated by extracting a low frequency component from a luminance component of the image. However, when an image is corrected using the local luminance correction, the contrast becomes partially low depending on the feature of the input image. Japanese Patent Application Laid-Open No. 2008-011286 discusses a method for obtaining a high quality (high contrast) image by generating a histogram of a pixel value distribution of all the pixels of a local luminance corrected image, and expanding a dynamic range of the local luminance corrected image by changing the generated histogram.

However, if the dynamic range is expanded by histogram processing for changing the pixel distribution of the histogram, the expansion may cancel an effect of the local luminance correction depending on a feature of the input image. For example, assuming a case that a dark portion of an input image is corrected to be brighter according to the local luminance correction, the corrected portion is distributed in the dark portion of the dynamic range, and the dynamic range has room for the dark side. In this case, the dynamic range will be expanded to the maximum when a level of such an image is corrected. Since the distribution is expanded toward the dark side, the portion which has been corrected to be bright according to the local luminance correction will be dark again.

This correction is described with reference to FIGS. 16A to 16C. FIG. 16A is an example of a histogram of an input luminance image. FIG. 16B is an example of a histogram of a local luminance corrected image. FIG. 16C is an example of a histogram of the local luminance corrected image which has undergone the dynamic range expansion processing. As is shown by a line 1160, pixel values of the dark portion of an input luminance image histogram are moved to the bright side after the local luminance correction processing. However, as is shown by a line 1161, when the dynamic range expansion of the local luminance corrected image is performed, the pixel values which have moved to the bright side are moved back to the dark side. As a result, the effect of the local luminance correction is cancelled.

SUMMARY OF THE INVENTION

According to an aspect of the present invention, an apparatus includes an acquisition unit configured to acquire a low frequency component of a luminance component of an image, a correction unit configured to correct the luminance component using the acquired low frequency component, a determination unit configured to determine a level correction amount of each pixel of the corrected image using a frequency distribution of low frequency components and a low frequency component of each pixel of the image, and a level correction unit configured to perform level correction using the determined level correction amount and a corrected luminance distribution of the image.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 14 is a flowchart illustrating processing performed by the local luminance correction processing unit illustrated in FIG. 13 according to the third exemplary embodiment.

DESCRIPTION OF THE EMBODIMENTS

Various exemplary embodiments, features, and aspects of the invention will be described in detail below with reference to the drawings.

Figure 1:
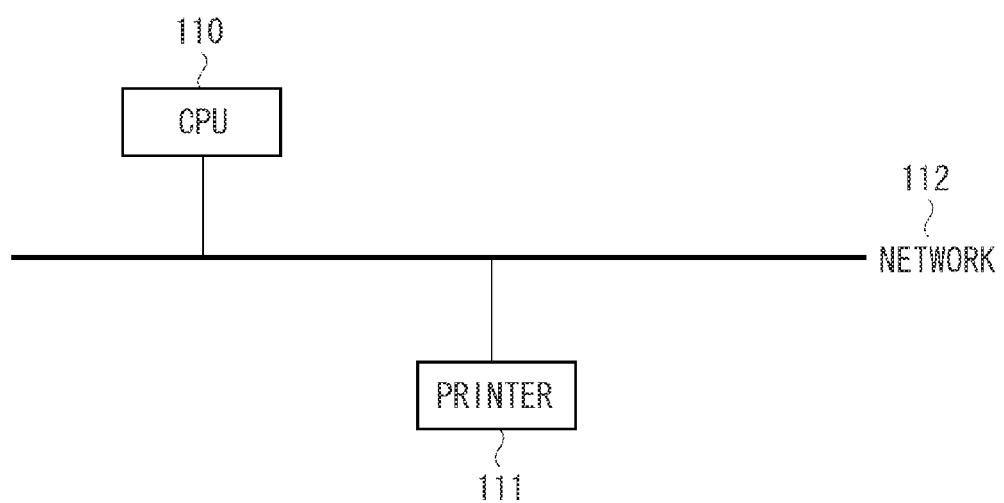
FIG. 1 illustrates a personal computer (PC) and a printer connected via a network.

A driver running on a PC will be used in describing a first exemplary embodiment of the present invention. FIG. 1 illustrates a PC 110 and a printer 111 connected via a network 112. Since the PC and the printer are connected via the network, they can transmit and receive image data and a signal such as a processing command to and from each other.

Figure 2:
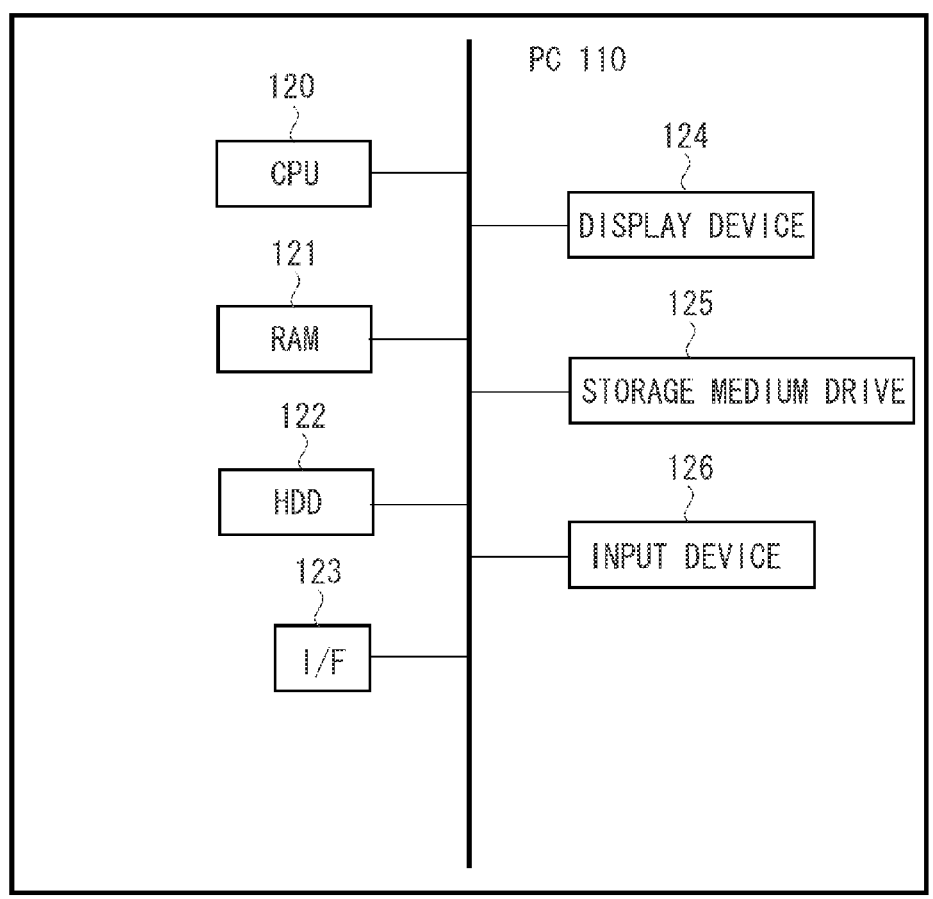
FIG. 2 illustrates a hardware configuration of the PC illustrated in FIG. 1.

FIG. 2 illustrates a hardware configuration of the PC 110 illustrated in FIG. 1. The PC 110 includes a central processing unit (CPU) 120, a random access memory (RAM) 121, a hard disk drive (HDD) 122, an interface (I/F) 123, a display device 124, a storage medium drive 125, and an input apparatus 126. The PC 110 can function as an image processing apparatus according to the present invention.

Figure 3:
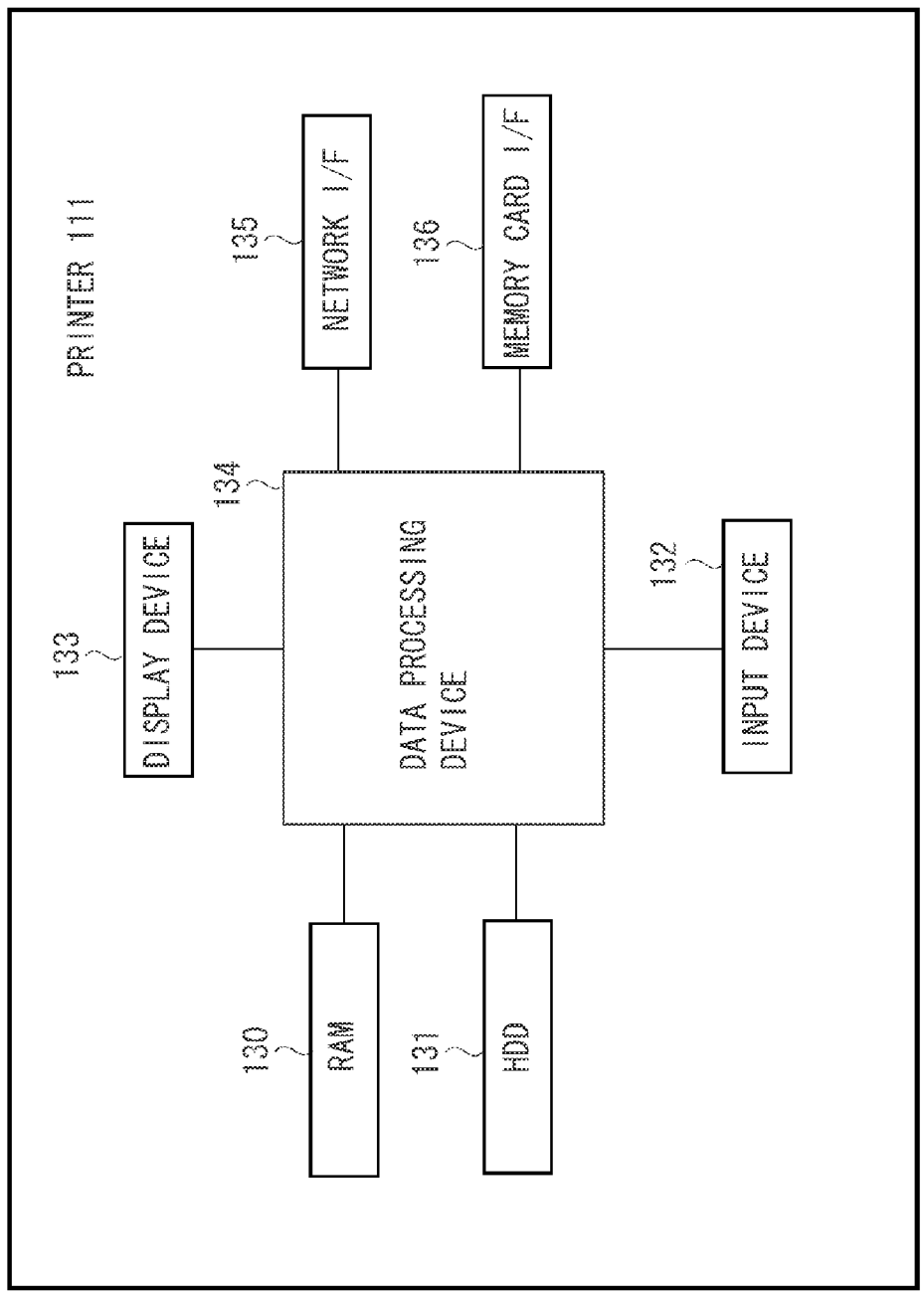
FIG. 3 illustrates a hardware configuration of the printer illustrated in FIG. 1.

FIG. 3 illustrates a hardware configuration of the printer 111 illustrated in FIG. 1. The printer 111 includes a RAM 130, an HDD 131, an input apparatus 132, a display device 133, a data processing device 134, a network I/F 135, and a memory card I/F 136.

Figure 4:
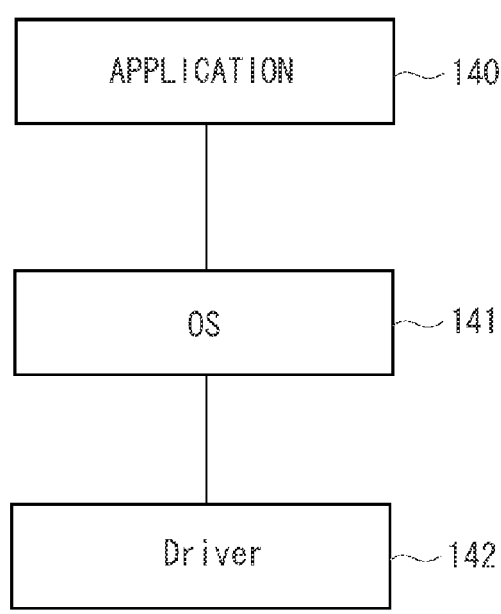
FIG. 4 illustrates a software configuration of the PC illustrated in FIG. 1.

FIG. 4 illustrates a software configuration of the PC 110. The software includes an application 140, an operating system (OS) 141, and a driver 142. The application 140 is stored in the HDD 122. When an instruction is given by a user, the application is loaded into the RAM 121 and executed by the CPU 120. A rendering instruction output from the application 140 is input in the driver 142 via the OS 141.

Figure 5:
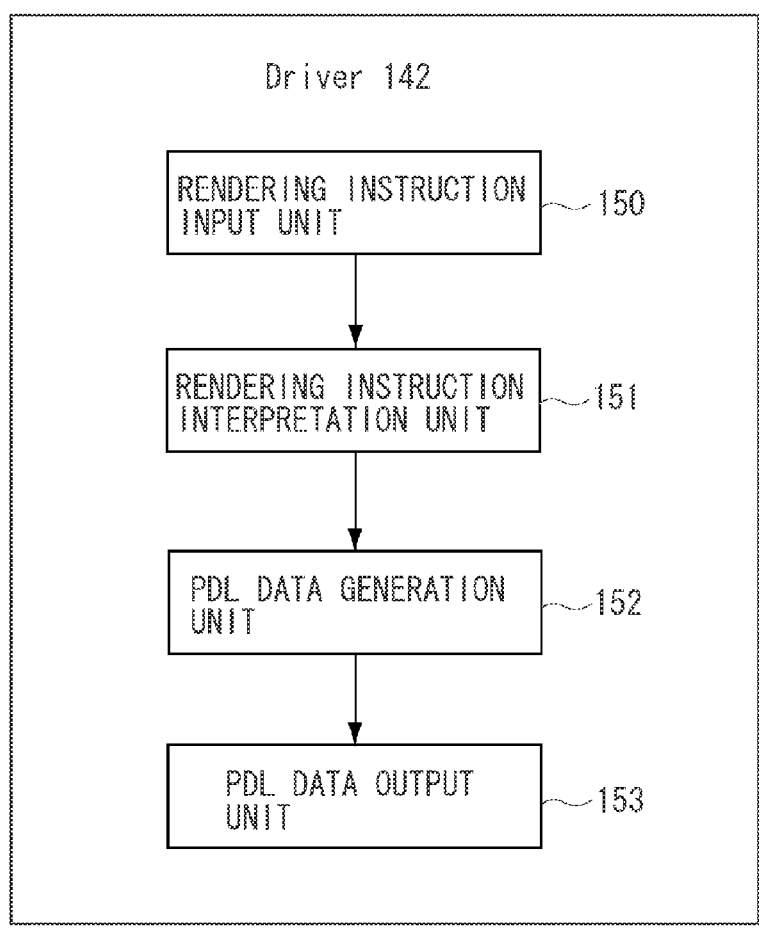
FIG. 5 illustrates a configuration of a driver illustrated in FIG. 4.

FIG. 5 illustrates a configuration of the driver 142 illustrated in FIG. 4. The driver 142 includes a rendering instruction input unit 150, a rendering instruction interpretation unit 151, a print description language (PDL) data generation unit 152, and a PDL data output unit 153. The rendering instruction input unit 150 receives a rendering instruction transmitted from the application 140 via the OS 141. The rendering instruction interpretation unit 151 interprets contents of the received rendering instruction. The PDL data generation unit 152 generates PDL data based on the interpreted instruction. Then, the generated PDL data is output by the PDL data output unit 153.

Figure 6:
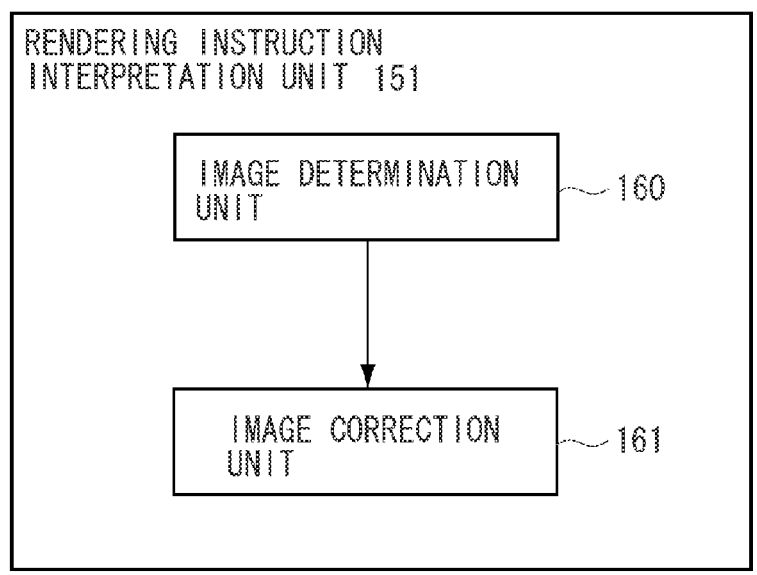
FIG. 6 illustrates a configuration of a rendering instruction interpretation unit illustrated in FIG. 5.

FIG. 6 illustrates a configuration of the rendering instruction interpretation unit 151 illustrated in FIG. 5. The rendering instruction interpretation unit 151 includes an image determination unit 160 and an image correction unit 161. The image determination unit 160 determines whether the image data which is a base of the rendering instruction input in the driver 142 is photographic image data. Whether the data is of a photographic image can be determined, for example, by generating a pixel frequency distribution (histogram) of the image data and classifying the feature of the pixel distribution. If it is determined as the photographic image data, the image correction unit 161 corrects the image. If it is not determined as the photographic image data, the image correction unit 161 does not correct the image.

Figure 7:
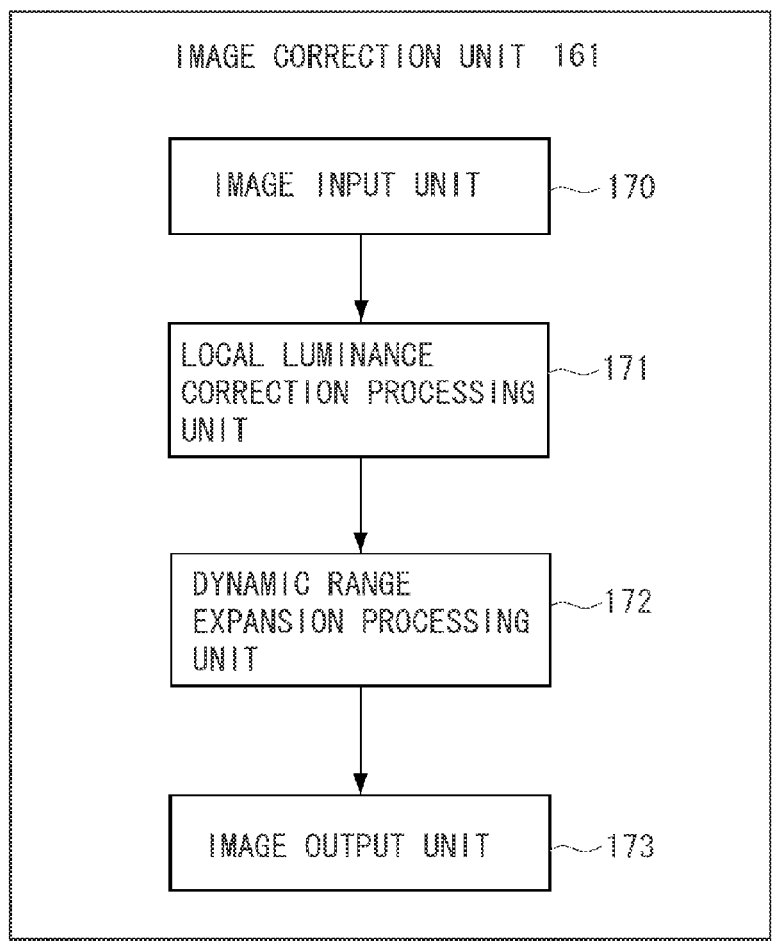
FIG. 7 illustrates a configuration of an image correction unit illustrated in FIG. 6 according to a first exemplary embodiment of the present invention.

FIG. 7 illustrates a configuration of the image correction unit 161 illustrated in FIG. 6. The image correction unit 161 includes an image input unit 170, a local luminance correction processing unit 171, a dynamic range expansion processing unit 172, and an image output unit 173. The image input unit 170 receives the image data which has been determined as the photographic image by the image determination unit 160. The local luminance correction processing unit 171 performs local luminance correction of the image data received by the image input unit 170. The dynamic range expansion processing unit 172 expands the dynamic range of the image data which has been corrected by the local luminance correction processing unit 171. Here, the dynamic range expansion processing is correction of a luminance level. The image output unit 173 outputs the image data which is subjected to the dynamic range expansion processing.

Figure 8:
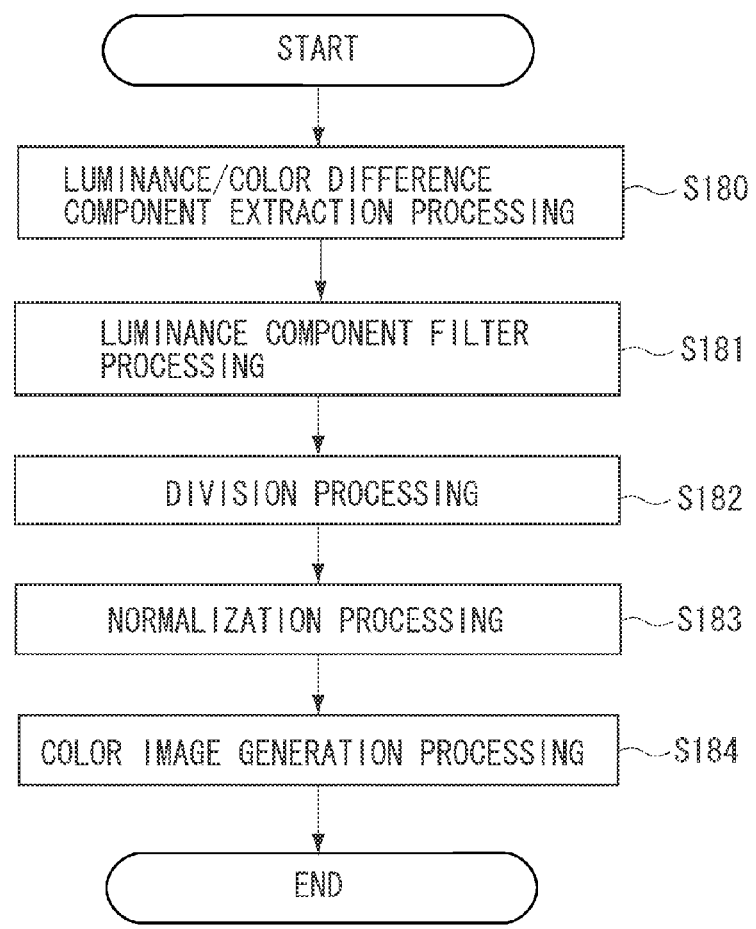
FIG. 8 is a flowchart illustrating processing performed by a local luminance correction processing unit illustrated in FIG. 7 according to the first exemplary embodiment.

FIG. 8 is a flowchart illustrating processing performed by the local luminance correction processing unit 171. The local luminance correction processing is used for removing an influence of an illumination light from an image. More particularly, it is processing for making a relatively dark portion of an image brighter. This effect is achieved by extracting illumination light components from the image and homogenizing the distribution of the components. According to the local luminance correction processing, a low frequency component of an image is used as an illumination light component.

Figure 15B:
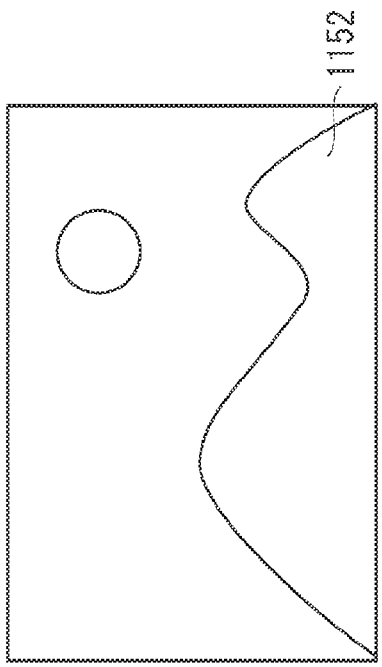
FIGS. 15A to 15C illustrate an input luminance image, a local luminance corrected image, and a low frequency component luminance image used for explaining the local luminance correction processing.
Figure 15A:
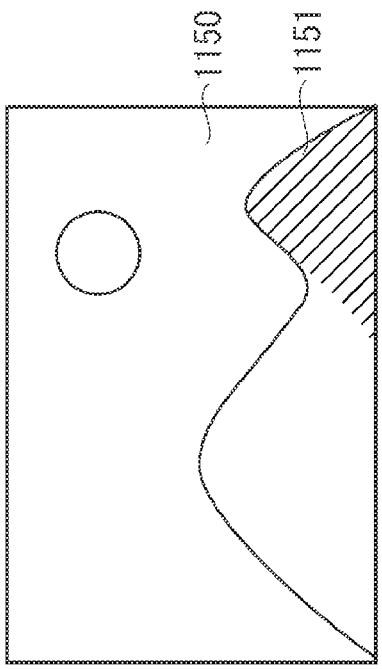
Figure 15C:
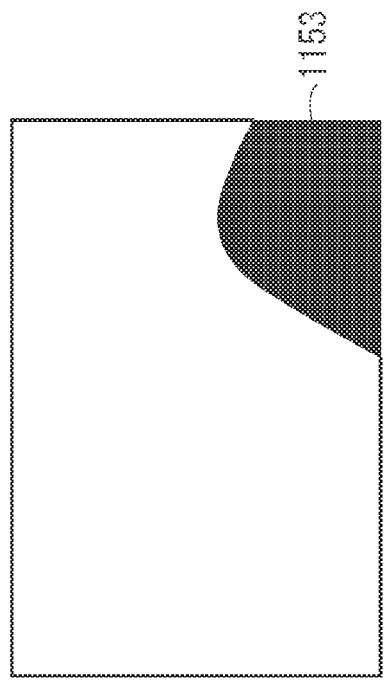
Figure 16A:
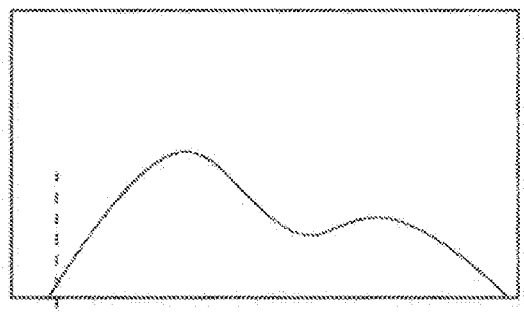
FIGS. 16A to 16C illustrate an example of histograms of an input luminance image, a local luminance corrected image, and a dynamic range expanded image.
Figure 16B:
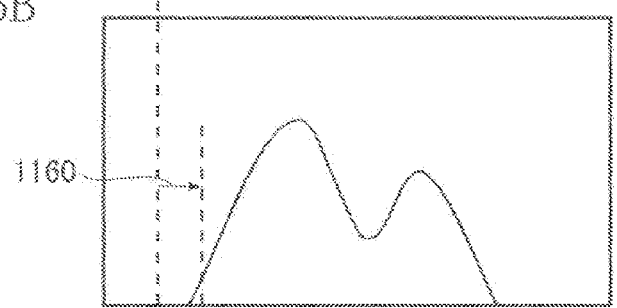
Figure 16C:
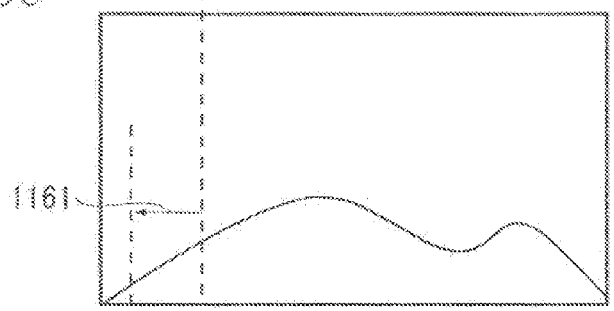

This process is described with reference to FIGS. 15A to 15C. FIG. 15A is an input luminance image. A portion 1150 is a bright portion and a shaded portion of a portion 1151 is a dark portion. FIG. 15B is a local luminance corrected image. A portion 1152 is a brightly-corrected portion. FIG. 15C is an illumination light component image (low frequency component luminance image). A portion 1153, which is blurry, corresponds to the shaded portion of the portion 1151 in FIG. 15A. The blurry portion is where the low frequency component is extracted. The local luminance correction processing is used for correcting the dark portion in the portion 1151 in FIG. 15A so that the brightness of the portion is similar to that of its neighboring portion as is the portion 1152 in FIG. 15B. The processing is realized by calculating a low frequency component image illustrated in FIG. 15C, roughly extracting a dark portion of the image, and correcting the extracted dark portion to be brighter.

Next, a processing flow will be described with reference to FIG. 8. In step S180, the local luminance correction processing unit 171 performs luminance and color difference component extraction processing and extracts a luminance component and a color difference component from the image. The extraction of the luminance component data and the color difference component data is performed by converting a color space. For example, if image data in an RGB color space is converted into image data in a YCbCr color space, the color components are obtained according to the following expressions.

$$Y = 0.29891*R + 0.58661*G + 0.11448*B$$

$$Cb = -0.16874*R - 0.33126*G + 0.50000*B$$

$$Cr = 0.50000*R - 0.41869*G + 0.08131*B$$

Here, Y is input image luminance component data (luminance component image data) and Cb and Cr are input image color difference component data. The conversion of the color space is not limited to conversion from the RGB color space to the YCbCr color space. For example, the color space can be changed to an XYZ color space, an L*a*b* color space, or an HLS color space.

In step S181, the local luminance correction processing unit 171 performs luminance component filter processing to the luminance component extracted by the luminance and color difference component extraction processing performed in step S180. According to the luminance component filter processing in step S181, a low frequency component of the luminance is extracted from the luminance component. The following description is a case where a Gaussian filter is used. The Gaussian filter is expressed by the following expression (1).

$$Ga = A\exp[-(x^2+y^2)/\sigma^2] \quad (1)$$

The expression satisfies the following condition.

$$\iint Ga\,dx\,dy = 1$$

Here, x and y express a pixel position. A is a multiplier and is a value which is set so as to satisfy the above described condition. σ is a standard deviation and is an arbitrary value used for adjusting an extent (a size) of the Gaussian filter. An extraction level of the luminance low frequency component is changed by adjusting the extent of the Gaussian filter. If the extent of the Gaussian filter is increased, the extraction level of the luminance low frequency component is increased. If the extent of the Gaussian filter is decreased, the extraction level of the luminance low frequency component is decreased. The value of σ (the size of the Gaussian filter) is set according to a feature of the image or a purpose of the correction. By applying the Gaussian filter to the image luminance component, the low frequency component of the image luminance component is extracted. Further, a table memory that stores a number of filters may be prepared in advance, and one filter can be selected from among the filters according to the size of the image.

In step S182, the local luminance correction processing unit 171 divides the pixel value (luminance component value) of the image by the value of the low frequency component obtained by the luminance component filter processing in step S181. More particularly, the local luminance correction processing unit 171 divides a luminance component value of a pixel by a low frequency component value of a pixel of the same pixel position, and performs this processing to all pixels. Further, subtraction can be used in place of division.

In step S183, the local luminance correction processing unit 171 performs normalization processing. Since the low frequency component is extracted from the luminance component according to the division processing in step S182, in many cases, the value of the image that has been subjected to the division processing is extremely small. Thus, the result of the division is normalized so that the value becomes the one that the image originally has. The luminance of each pixel of the image after the division is adjusted so that an average luminance value of the image after the division is equal to an average luminance value of the image luminance components. This is expressed by the following expression (2).

$$Y' = (Y_{avr}/R_{avr})*(Y/L) \quad (2)$$

Here, Y is a luminance component of an image, Y' is a luminance component after the normalization, $Y_{avr}$ is an average luminance value of the image luminance components, $R_{avr}$ is a luminance average value of the image after the division, and L is a luminance low frequency component. If the value of L is 0, Y' is determined to be 0 without using the above described expression.

In step S184, the local luminance correction processing unit 171 performs color image generation processing. The color image generation processing in step S184 is processing opposite to the luminance and color difference component extraction processing performed in step S180. For example, if an image in the RGB color space is converted into the YCbCr color space according to the luminance and color difference component extraction processing performed in step S180, the conversion of the image in the YCbCr color space into the RGB color space is expressed by the following expression (3).

$$R = Y + 1.40200*Cr$$

$$G = Y - 0.34414*Cb - 0.71414*Cr$$

$$B = Y + 1.77200*Cb \quad (3)$$

According to this processing, a color image in which only the luminance component has been adjusted can be generated.

Figure 9:
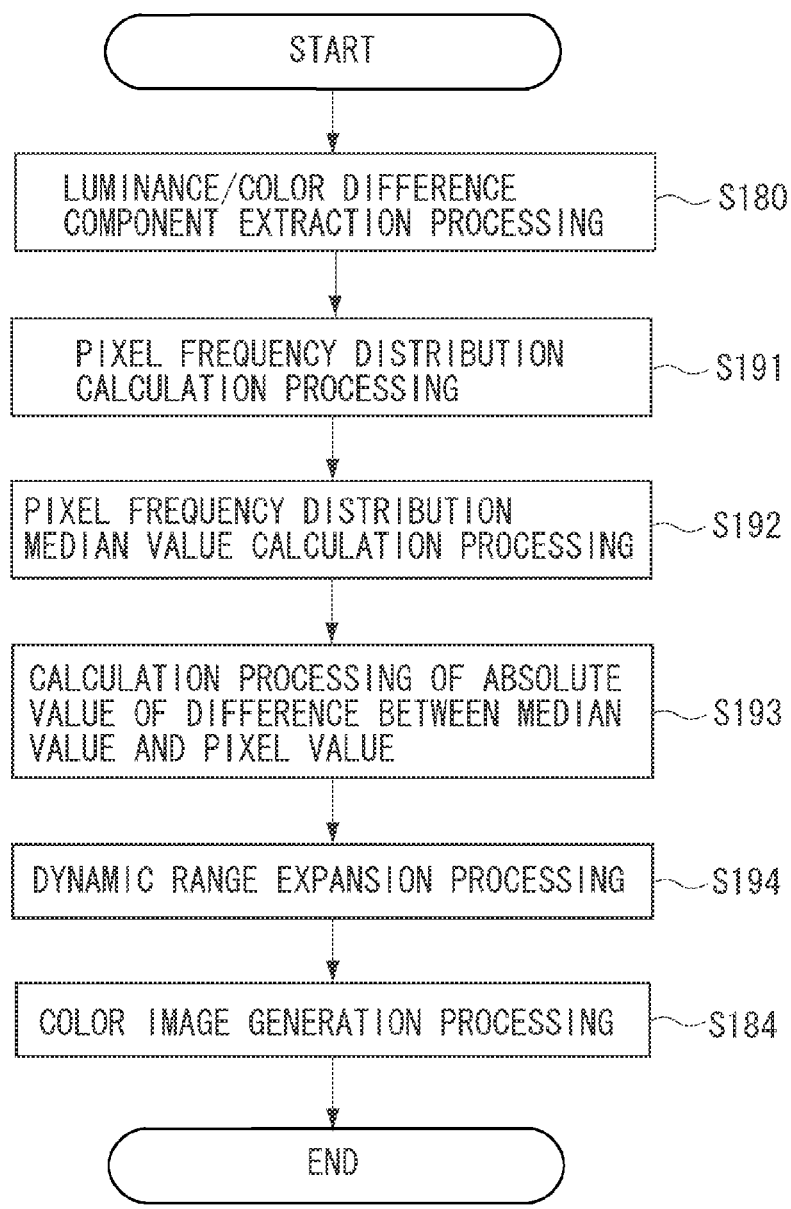
FIG. 9 is a flowchart illustrating processing performed by a dynamic range expansion processing unit illustrated in FIG. 7 according to the first exemplary embodiment.

FIG. 9 is a flowchart illustrating processing performed by the dynamic range expansion processing unit 172 illustrated in FIG. 7. The dynamic range expansion processing unit 172 expands a dynamic range of a luminance component of image data (i.e., calculates a dynamic range expansion amount). According to the present exemplary embodiment, the dynamic range expansion processing (level correction processing) is performed based on the luminance low frequency component image which is obtained by the luminance component filter processing performed by the local luminance correction processing unit 171 in step S181. Accordingly, the dynamic range expansion processing can be performed for each pixel, and the dynamic range can be expanded according to the feature of the correction performed by the local luminance correction processing unit 171.

In step S180, the dynamic range expansion processing unit 172 performs the luminance and color difference component extraction processing to the image data corrected by the local luminance correction processing unit 171. Since the luminance and color difference component extraction processing is similar to the luminance and color difference component extraction processing performed by the local luminance correction processing unit 171 in step S180 in FIG. 8, the description is not repeated.

In step S191, the dynamic range expansion processing unit 172 performs pixel frequency distribution calculation processing of the luminance low frequency component image obtained by the luminance component filter processing (step S181). The pixel frequency distribution of the image data can be calculated in such a manner that, for example, if the image data is 8 bit (0 to 255) and a certain pixel has a pixel value of 0, a counter corresponding to 0 is incremented by 1. After obtaining the pixel values of all the pixels of the image data in the similar manner, then the number of times each of the values from 0 to 255 has been appeared is counted.

In step S192, the dynamic range expansion processing unit 172 performs pixel frequency distribution median value calculation processing. If the above example described in the calculation method of the pixel frequency distribution is used in this processing, the calculation of the median value is performed by summing up the frequency (counted values) of each pixel value in order starting from 0. When the total value reaches 50% of the number of all the pixels, the pixel value that is referenced at that time is determined as the median value.

In step S193, the dynamic range expansion processing unit 172 (level correction processing unit) performs absolute value calculation processing of the difference between the median value of the low frequency image obtained in step S181 and the pixel value of the low frequency image obtained in step S181. More specifically, an absolute value of the difference between the median value of the low frequency image obtained by the pixel frequency distribution median value calculation processing performed in step S192 and the pixel value of the luminance low frequency component image will be calculated for all pixels. Then, an image based on the absolute values of the differences will be generated. In step S192, the median value of the low frequency image is calculated, and the calculated median value is used in step S193. However, in step S192, a median value of the luminance component of the image corrected by the local luminance correction processing unit 171 can be calculated instead of the median value of the low frequency image, and the calculated median value may be used in step S193. Further, the absolute value of the difference between the median value of the low frequency image and the pixel value of the luminance low frequency component image is calculated in step S193, the luminance component of the image corrected by the local luminance correction processing unit 171 can be used for calculation in step S193 instead of the pixel value of the luminance low frequency component image.

In step S194, using the absolute values of the differences obtained by the absolute value calculation processing performed in step S193, the dynamic range expansion processing unit 172 performs dynamic range expansion processing to the luminance component image extracted by the luminance and color difference component extraction processing performed in step S180. More specifically, the absolute value of the difference calculated in step S193 is calculated for each pixel of the image corrected by the local luminance correction processing unit 171, and in the dynamic range expansion processing performed in step S194, the greater the calculated absolute value is, the smaller a correction amount of the dynamic range corresponding to the pixels of the image will be. On the other hand, the smaller the calculated absolute value is, the greater the correction amount of the dynamic range corresponding to the pixels of the image will be.

In other words, all the pixels of the image data corrected by the local luminance correction processing unit 171 are furthermore corrected (linearly corrected) according to the expression below.

$$y = Ax + B - S (x-y<0)$$

$$y = Ax + B + S (x-y>=0)$$

y is a pixel after the dynamic range expansion processing (after the correction), x is a pixel before the dynamic range expansion processing. S is the absolute value of the difference between the median value and the pixel value of the low frequency image which is obtained according to the absolute value calculation processing performed in step S193. S is either added or subtracted. A and B are values based on pixel frequency distribution of the image data corrected by the local luminance correction processing unit 171. According to the expression, it is understood that the greater the amount corrected by the local luminance correction processing unit 171 is, the smaller the amount corrected by the dynamic range expansion processing is. On the contrary, the smaller the amount corrected by the local luminance correction processing unit 171 is, the greater the amount corrected by the dynamic range expansion processing is.

Accordingly, the dynamic range of the image can be expanded while maintaining the effect of the correction performed by the local luminance correction processing unit 171.

$$A = SDo - HLo/SDi - HLi$$

$$B = SDo*HLi - HLo*SDi/HLi - SDi$$

SDi is an arbitrary value closer to 0 than the median value with respect to the pixel frequency distribution of the image data corrected by the local luminance correction processing unit 171. HLi is an arbitrary value closer to 255 than the median value. SDo is an arbitrary value closer to 0 than the median value with respect to the pixel frequency distribution of the image data after the dynamic range expansion. HLo is an arbitrary value closer to 255 than the median value with respect to the pixel frequency distribution of the image data after the dynamic range expansion. SDi expresses a dark portion of the image data corrected by the local luminance correction processing unit 171. HLi expresses a bright portion of the image data corrected by the local luminance correction processing unit 171. Further, SDo and HLo express the extent to which the dynamic range with respect to the pixel frequency distribution of the image data corrected by the local luminance correction processing unit 171 is expanded.

For example, if SDo=0 and HLo=255, the dynamic range can be expanded to the maximum. Generally, values of A and B are set to arbitrary values according to the level of change of the dynamic range. However, according to the present exemplary embodiment, since the dynamic range is changed according to the level of correction performed by the local luminance correction processing unit 171, fixed values such as SDo=0 and HLo=255 can also be used.

In step S184, the dynamic range expansion processing unit 172 performs the color image generation processing. Since the color image generation processing in step S184 in FIG. 9 is similar to the color image generation processing performed by the local luminance correction processing unit 171 in step S184 in FIG. 8, the description is not repeated.

According to the above described processing, the dynamic range can be expanded while maintaining the effect of the luminance correction obtained by the local luminance correction. Accordingly, the local luminance can be corrected while maintaining the contrast.

According to the first exemplary embodiment, processing concerning the driver 142 of the PC 110 has been described. Similar processing can also be performed by the printer 111 (on a controller side). Thus, the processing can be performed in terms of software and hardware.

Figure 10:
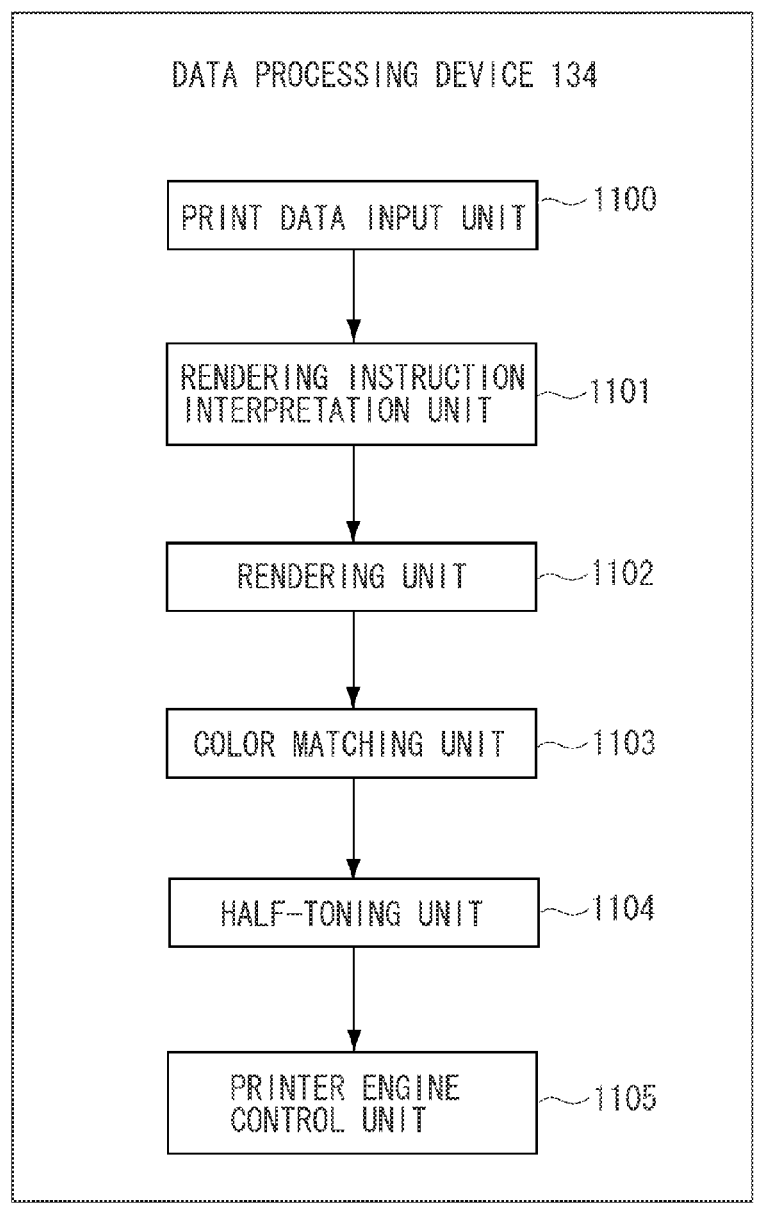
FIG. 10 illustrates a configuration of a data processing apparatus illustrated in FIG. 3.

FIG. 10 illustrates a configuration of the data processing device 134 illustrated in FIG. 3. The data processing device 134 includes a print data input unit 1100, a rendering instruction interpretation unit 1101, a rendering unit 1102, a color matching unit 1103, a half-toning unit 1104, and a printer engine control unit 1105.

When the image data is input in the data processing device 134 via the memory card I/F 136 illustrated in FIG. 3, the print data input unit 1100 receives the input image data, and transmits the data to the rendering instruction interpretation unit 1101. The rendering instruction interpretation unit 1101 interprets the image data and transmits the interpreted data to the rendering unit 1102. The rendering unit 1102 renders the image data interpreted by the rendering instruction interpretation unit 1101 into bitmap format. Then, the color matching unit 1103 converts the color space of the bitmapped image so that the format of the image is acceptable by the printer. The image having the color space converted is processed by the half-toning unit 1104, and then transmitted to the printer engine control unit 1105. The printer engine control unit 1105 controls the printer engine to output the transmitted image.

The rendering instruction interpretation unit 1101 of the data processing device 134 in FIG. 10 performs processing similar to the processing performed by the rendering instruction interpretation unit 151 of the driver 142 illustrated in FIG. 5. Thus, descriptions of various units included in the rendering instruction interpretation unit 1101, various units included in a device corresponding to the image correction unit 161, and a processing flow of such units are omitted. According to the present alternate version, the image data is input in the data processing device 134 via the memory card I/F 136 illustrated in FIG. 3. However, the image data may also be input in the data processing device 134 from the driver 142 via the network I/F 135 illustrated in FIG. 3 as is with the first exemplary embodiment. In that case, the device which corresponds to the image determination unit 160 of the rendering instruction interpretation unit 1101 determines whether the image has already been corrected by the driver 142. If the image has already been corrected, then further correction of the image will not be performed by the data processing device 134.

According to the first exemplary embodiment, the absolute value of the difference is obtained based on the median value of the pixel frequency distribution of the luminance low frequency component image obtained by the luminance component filter processing performed by the local luminance correction processing unit 171 (step S181 in FIG. 8). According to a second exemplary embodiment, the absolute value of the difference is obtained based on the average value of the luminance component image extracted by the luminance and color difference component extraction processing performed by the local luminance correction processing unit 171 in step S180 in FIG. 8. Descriptions of the configurations similar to those of the first exemplary embodiment are not repeated and the illustrations in the first exemplary embodiment will be used.

Figure 11:
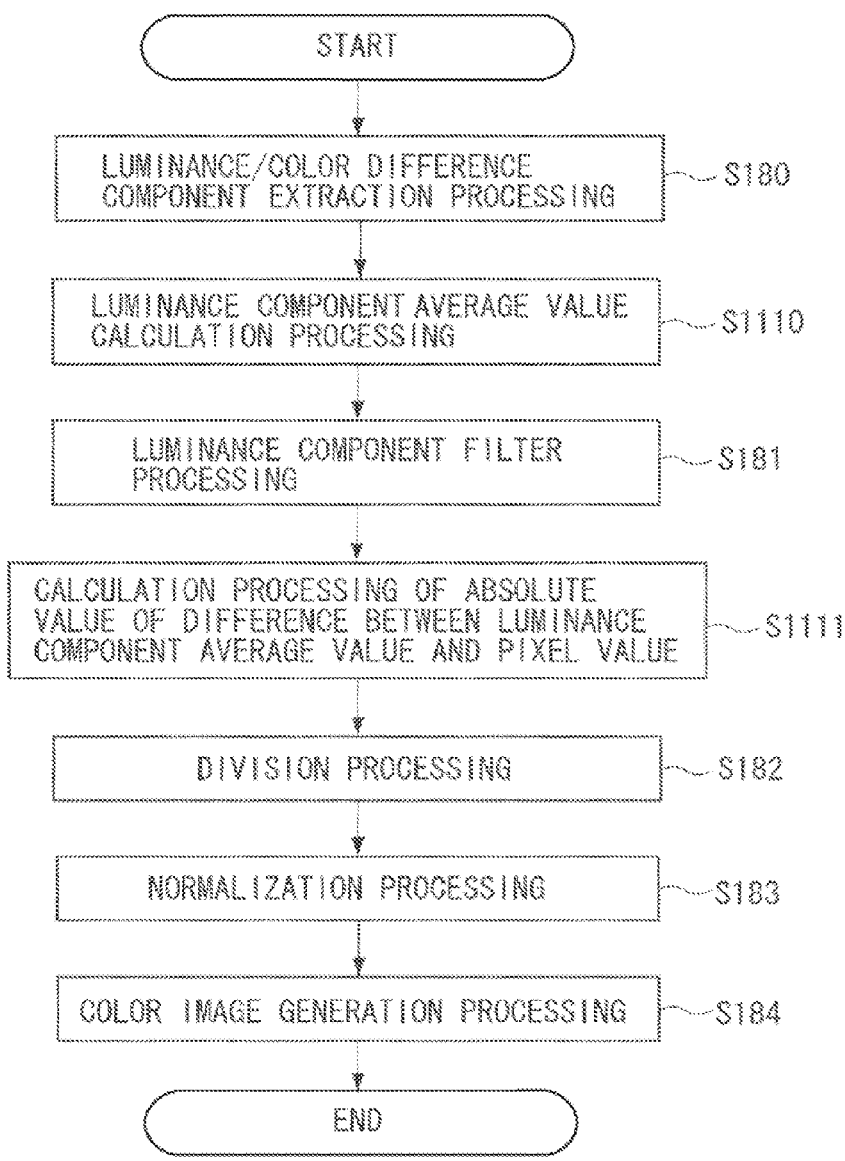
FIG. 11 is a flowchart illustrating processing performed by the local luminance correction processing unit illustrated in FIG. 7 according to a second exemplary embodiment of the present invention.

FIG. 11 is a flowchart illustrating processing performed by the local luminance correction processing unit 171 illustrated in FIG. 7 according to the second exemplary embodiment of the present invention. In step S180, the local luminance correction processing unit 171 performs the luminance and color difference component extraction processing. Since the processing is similar to the processing performed in the first exemplary embodiment, the description is not repeated. In step S1110, the local luminance correction processing unit 171 performs luminance component average value calculation processing with respect to the extracted luminance component image. According to the processing, an average value of all the pixel values of the luminance component is obtained. In step S181, the local luminance correction processing unit 171 performs the luminance component filter processing. Since the processing is similar to the processing performed in the first exemplary embodiment, the description is not repeated.

In step S1111, the local luminance correction processing unit 171 performs absolute value calculation processing of the difference between the luminance component average value and the pixel value. According to the processing, the absolute value of the difference between the luminance component average value obtained by the luminance average value calculation processing performed in step S1110 and the pixel value of the luminance low frequency component image generated according to the luminance component filter processing performed in step S181 is calculated for all the pixels. Then in step S1111, as is with the first exemplary embodiment, an image based on the absolute value of the difference between the luminance average value and the pixel value of the luminance low frequency component image will be generated. In steps S182, S183, and S184, the local luminance correction processing unit 171 performs the division processing, the normalization processing, and the color image generation processing in sequence. Since the processing is similar to that described in the first exemplary embodiment, the descriptions are not repeated.

Figure 12:
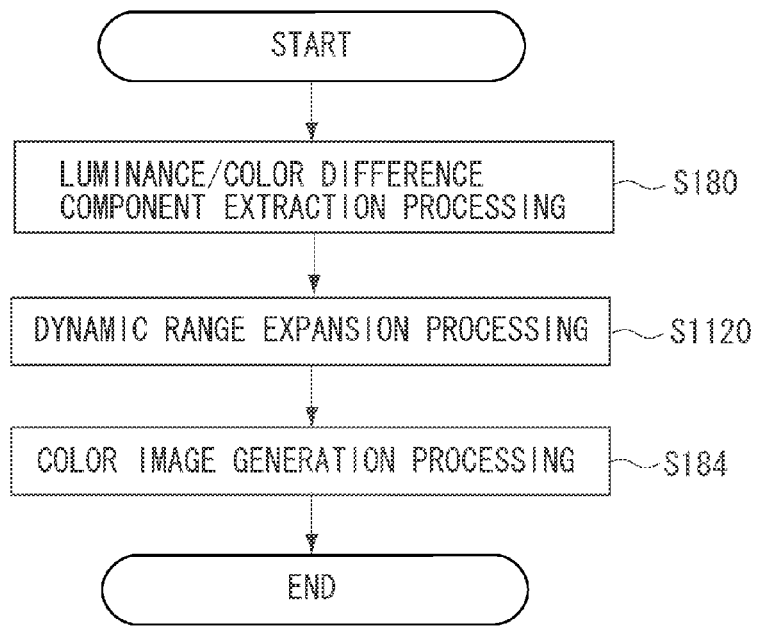
FIG. 12 is a flowchart illustrating processing performed by the dynamic range expansion processing unit illustrated in FIG. 7 according to the second exemplary embodiment.

FIG. 12 is a flowchart illustrating processing performed by the dynamic range expansion processing unit 172 illustrated in FIG. 7 according to the second exemplary embodiment of the present invention. In step S180, the dynamic range expansion processing unit 172 performs the luminance and color difference component extraction processing. Since the processing is similar to the processing performed in the first exemplary embodiment, the description is not repeated. In step S1120, the dynamic range expansion processing unit 172 performs the dynamic range expansion processing.

The basic processing is similar to that in the first exemplary embodiment. Further, the median value of the pixel frequency distribution of the luminance low frequency component image obtained by the luminance component filter processing performed by the local luminance correction processing unit 171 in step S181 in FIG. 8 can be simply replaced with the luminance component average value newly calculated in the second exemplary embodiment. Thus, detailed descriptions are omitted. In step S184, the dynamic range expansion processing unit 172 performs the color image generation processing. Since the processing is similar to the processing performed in the first exemplary embodiment, the description is not repeated.

According to the above described processing, since the average value of the luminance components is slightly shifted from the center value of the distribution compared with the median value of the pixel frequency distribution of the luminance low frequency component image, the final effect of correction may be slightly reduced. However, since the calculation of the pixel frequency distribution of the image is not necessary, it contributes to reducing an amount of processing.

Figure 13:
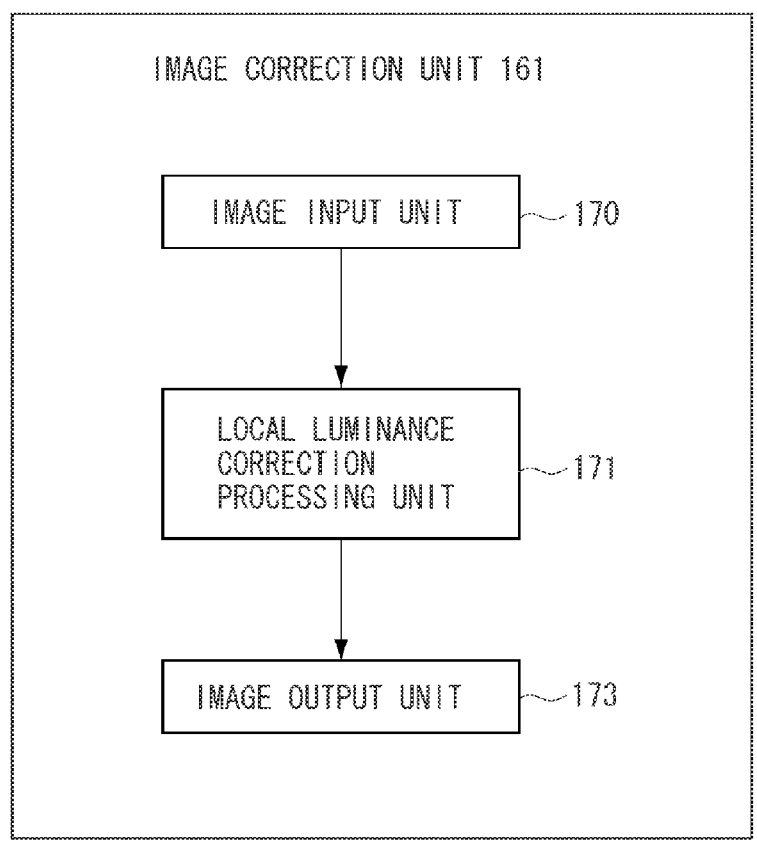
FIG. 13 illustrates a configuration of the image correction unit illustrated in FIG. 6 according to a third exemplary embodiment of the present invention.

According to a third exemplary embodiment, the local luminance correction processing unit 171 performs the dynamic range expansion processing (step S1140 in FIG. 14) in place of the normalization processing (step S183 in FIG. 8). FIG. 13 illustrates the configuration of the image correction unit 161 according to the third exemplary embodiment. The image correction unit 161 according to the third exemplary embodiment includes the image input unit 170, the local luminance correction processing unit 171, and the image output unit 173. It is the same as the image correction unit 161 illustrated in FIG. 7 but excluding the dynamic range expansion processing unit 172.

FIG. 14 is a flowchart illustrating the processing of the local luminance correction processing unit 171 according to the third exemplary embodiment. Since each processing illustrated in FIG. 14 is similar to the processing with the same step number in the first exemplary embodiment except for the dynamic range expansion processing performed in step S1140, the descriptions thereof are not repeated.

the local luminance correction processing unit 171 performs the luminance and color difference component extraction processing (step S180) and the luminance component filter processing (step S181). Further, the local luminance correction processing unit 171 performs the pixel frequency distribution calculation processing (step S191), the pixel frequency distribution median value calculation processing (step S192), the calculation processing of the absolute value of the difference between the median value and the pixel value (step S193), and the division processing (step S182).

Then in step S1140, the local luminance correction processing unit 171 performs the dynamic range expansion processing. The difference from the dynamic range expansion processing performed in the first exemplary embodiment is that the input image data is not normalized and a floating point exists. The value is close to 0 to 1. Although the dynamic range expansion processing in step S1140 is similar to that performed in the first exemplary embodiment, conversion of the floating point value into an integer is carried out after the processing. This can be performed by simply dropping the fractional portion of the value. In step S184, the local luminance correction processing unit 171 performs the color image generation processing.

According to the above described processing, since a considerable amount of error can be included according to the conversion of a floating point value into an integer value with respect to the dynamic range expansion processing in step S1140, the effect of the final correction may be reduced. However, it contributes to reducing an amount of processing and increasing a processing speed. Further, by combining the processing in the second exemplary embodiment and replacing the median value of the pixel frequency distribution of the luminance low frequency component image with the luminance component average value, the amount of processing can be further reduced.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-216534 filed Sep. 18, 2009, which is hereby incorporated by reference herein in its entirety.

What is claimed is:

1. An apparatus comprising at least one processor which functions as:
    an acquisition unit configured to acquire a low frequency component of a luminance component of an image;
    a correction unit configured to correct a luminance component of the image using the acquired low frequency component;
    a determination unit configured to determine a level correction amount of pixels of the corrected image using a value obtained from a frequency distribution of the image corrected by the correction unit and a luminance component of pixels of the image corrected by the correction unit; and
    a level correction unit configured to perform level correction on the corrected image using the determined level correction amount.

2. The apparatus according to claim 1, wherein the value is a median value of the frequency distribution of the image corrected by the correction unit,
    wherein the determination unit calculates a difference between the median value and the luminance component of the pixels of the image corrected by the correction unit, and
    wherein the larger the difference is, the smaller the level correction amount of pixels is.

3. The apparatus according to claim 1, wherein the correction unit corrects the luminance component of the image based on a result obtained by dividing a value of a luminance component of a pixel of the image by a value of a low frequency component corresponding to the pixel.

4. The apparatus according to claim 3, wherein the correction unit corrects the luminance component before the division by performing normalization of a value of luminance of the image subjected to the division so that an average value of the luminance component of the image subjected to the division becomes equal to an average value of the luminance component of the image before the division.

5. The apparatus according to claim 1, wherein the acquisition unit acquires the low frequency component of the luminance component by extracting the luminance component of the image and filtering the extracted luminance component.

6. The apparatus according to claim 1, wherein the value is an average value of the frequency distribution of the image corrected by the correction unit,
    wherein the determination unit calculates a difference between the average value and the luminance component of the pixels of the image corrected by the correction unit, and
    wherein the larger the difference is, the smaller the level correction amount of pixels is.

7. A method executed by an image processing apparatus, comprising:
    acquiring a low frequency component of a luminance component of an image;
    correcting a luminance component of the image using the acquired low frequency component;
    determining a level correction amount of pixels of the corrected image using a value obtained from a frequency distribution of the corrected image and a luminance component of pixels of the corrected image; and
    performing level correction on the corrected image using the determined level correction amount.

8. A non-transitory computer-readable medium storing a computer program for causing a computer to execute a method, the method comprising:
    acquiring a low frequency component of a luminance component of an image;
    correcting a luminance component of the image using the acquired low frequency component;
    determining a level correction amount of pixels of the corrected image using a value obtained from a frequency distribution of the corrected image and a luminance component of pixels of the corrected image; and
    performing level correction on the corrected image using the determined level correction amount.

* * * * *